(12) United States Patent
Baker (10) Patent No.: US 7,772,960 B2
(45) Date of Patent: Aug. 10, 2010

(54) PRE-LOADED FORCE SENSING RESISTOR AND METHOD

(75) Inventor: Jeffrey R. Baker, Thousand Oaks, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 514 days.

(21) Appl. No.: 11/986,873

(22) Filed: Nov. 27, 2007

(65) Prior Publication Data

US 2009/0134966 A1    May 28, 2009

(51) Int. Cl.
    *H01C 10/10*    (2006.01)
(52) U.S. Cl. ............................ 338/99; 338/2; 338/114; 345/178; 345/159
(58) Field of Classification Search .................. 338/99, 338/2, 114; 345/178, 156, 157, 173; 200/511–512
    See application file for complete search history.

(56) References Cited

U.S. PATENT DOCUMENTS

| | | | |
|---|---|---|---|
| 4,051,540 A * | 9/1977 | Wilder et al. .............. 360/72.3 |
| 4,314,227 A | 2/1982 | Eventoff | |
| 4,314,228 A | 2/1982 | Eventoff | |
| 4,489,302 A | 12/1984 | Eventoff | |
| 5,440,237 A | 8/1995 | Brown et al. | |
| 5,515,040 A * | 5/1996 | Lee et al. ............... 340/870.04 |
| 7,068,142 B2 * | 6/2006 | Watanabe et al. ............. 338/47 |
| 7,113,179 B2 | 9/2006 | Baker et al. | |
| 7,528,337 B2 * | 5/2009 | Tanabe et al. ............... 200/511 |
| 2006/0007172 A1 | 1/2006 | Baker et al. | |

* cited by examiner

*Primary Examiner*—Kyung Lee
(74) *Attorney, Agent, or Firm*—Brooks Kushman P.C.

(57) ABSTRACT

A force sensing resistor (FSR) includes a substrate having separated electrically conductive traces and another substrate having a resistive layer in which the substrates are subjected to a biasing force such that the substrates contact one another with the resistive layer electrically connecting the traces with a resistance inversely dependent on the biasing force. Upon an external force applied towards a substrate, the substrates contact one another with a total force which is the sum of the forces with the resistive layer electrically connecting the traces with a resistance inversely dependent on the total force. An FSR output which is a function of the resistance is measured. Whether a change in magnitude of the FSR output during a time interval is greater than a threshold is determined. A touch applied on the FSR is detected during the time interval if the change is greater than the threshold.

20 Claims, 5 Drawing Sheets

FIG. 11 ies in different designs.

PRE-LOADED FORCE SENSING RESISTOR AND METHOD

BACKGROUND OF THE INVENTION

1. Field of the Invention

The present invention relates to force sensing resistors.

2. Background Art

A pressure transducer may generate a signal indicative of the amount and location of pressure applied on the transducer. A pressure transducer enables a user to provide input for portable electronic devices like personal digital assistants, telephones, remote controls, etc. Such portable devices are trending toward increasing functionality without increasing physical size. The increased functionality is accompanied by a need for more user input and interaction. This leads to demand for intuitive input devices such as touch surfaces useable in the portable devices.

A construction for a pressure transducer includes one or more force sensing resistors (FSRs). Various FSRs have been described such as in U.S. Pat. Nos. 4,314,227; 4,314,228; and 4,489,302. An FSR is useful for adding to the utility of touch interfaces. By sensing force, an FSR could be used, for example, to determine when the front glass surface of a phone is touched and then subsequently released.

A basic FSR includes two substrates (i.e., membranes) separated by a thin air gap. A spacer around the edges of the substrates and the rigidity of the substrates maintain the air gap. One substrate includes electrically conductive traces arranged into two sets of interdigitated fingers. The traces of one finger set are electrically distinct from the traces of the other finger set. The other substrate includes FSR ink. When a force is applied to the FSR such that the substrates are pressed together, the FSR ink electrically connects traces of the finger sets together with a resistance dependent on the applied force.

When no force is applied to the FSR, the air gap remains open and the FSR is in an open circuit. Only with the application of a small force does the air gap close and, consequently, the FSR has a finite resistance. This has been viewed as advantageous because the open circuit state is a distinct and unambiguous "not touched" signal. This means that the FSR does not require continuous measurement in order to detect touch. As such, a measurement processor can remain in a power saving sleep mode whereby an initial force takes the FSR from the open circuit state to some finite resistance which can be used to provide a wake-up signal to the measurement processor.

However, in portable devices such as cell phones, mp3 players, etc., where thinness is critical, it can be difficult to design mechanics that successfully maintain the air gap during a non-touched state. An FSR whose substrates touch even in the absence of an externally applied force is a "pre-loaded" FSR.

SUMMARY OF THE INVENTION

An object of the present invention includes embracing pre-load as an alternative for a force sensing resistor (FSR) instead of an FSR which has an air gap.

A further object of the present invention includes a method of detecting presses and releases on a pre-loaded FSR by measuring the time derivative of the electrical resistance of the pre-loaded FSR thereby enabling more facile use of FSRs in different designs.

Another object of the present invention includes a method of mounting an FSR in a perpetually pre-loaded state thereby enabling more facile use of FSRs in different designs.

In carrying out the above objects and other objects, the present invention provides a FSR having first and second substrates. The first substrate has first and second electrically conductive traces on an inner surface. The traces are electrically separated from one another. The second substrate has a resistive layer on an inner surface. The substrates are subjected to a biasing force such that during the biasing force the substrates are in contact with one another with the resistive layer contacting and electrically connecting the traces together with an electrical resistance that inversely depends on the biasing force. While an external force is applied to one of the substrates in a direction toward the other substrate, the substrates contact one another with a total force which is the sum of the biasing force and the external force with the resistive layer contacting and electrically connecting the traces together with an electrical resistance that inversely depends on the total force. The biasing force is present regardless of either the presence or absence of the external force. The resistive layer may include a force sensing resistor ink.

The first substrate may include a third electrically conductive trace on the inner surface. The traces are electrically separated from one another, wherein the first and second traces are interdigitated with one another in a first area of the inner surface of the first substrate and the second and third traces are interdigitated with one another in a different second area of the inner surface of the first substrate. During the biasing force the resistive layer contacts and electrically connects the first and second traces together and the second and third traces together with an electrical resistance that inversely depends on the biasing force. While a first external force is applied adjacent to the first area to one of the substrates in a direction toward the other substrate, the substrates contact one another at the first area with a first total force which is the sum of the biasing force and the first external force with the resistive layer contacting and electrically connecting the first and second traces together with an electrical resistance that inversely depends on the first total force. While a second external force is applied adjacent to the second area to one of the substrates in a direction toward the other substrate, the substrates contact one another at the second area with a second total force which is the sum of the biasing force and the second external force with the resistive layer contacting and electrically connecting the second and third traces together with an electrical resistance that inversely depends on the second total force.

The FSR may further include an actuator puck attached to an outer surface of one of the substrates and subjects the biasing force onto the substrates. In this event, the FSR may further include a spacer which attaches the substrates together such that an air gap separates the inner surfaces of the substrates. In turn, the actuator puck compresses the substrates together with the biasing force such that the inner surfaces of the substrates are in contact with one another with the air gap being eliminated.

Also, in carrying out the above objects and other objects, the present invention provides a method for a FSR having first and second substrates with the first substrate including electrically conductive and separated traces and the second substrate including a resistive layer in which the substrates are continuously subjected to a biasing force such that the substrates contact one another with the resistive layer contacting and electrically connecting the traces together with an electrical resistance that inversely depends on the biasing force. Upon an external force being applied to one of the substrates in a direction toward the other substrate, the substrates contact one another with a total force which is the sum of the biasing force and the external force with the resistive layer contacting and electrically connecting the traces together with an electrical resistance that inversely depends on the total force. The method includes measuring samples of an output of the FSR periodically over a time period in which the FSR output is a function of the electrical resistance. The method further includes determining whether a change in magnitude between at least two consecutive FSR output samples during a first time interval of the time period is greater than a threshold. The method further includes detecting an external touch applied on the FSR during the first time interval if the change in magnitude between the at least two consecutive FSR output samples during the first time interval is greater than the threshold. The biasing force is present regardless of either the presence or absence of the external force.

The method may further include determining whether a change in magnitude between at least two consecutive FSR output samples in a subsequent second time interval of the time period is less than a second threshold. In this event, the method further includes detecting release of the touch from the FSR during the second time interval if the change in magnitude between the at least two consecutive FSR output samples during the second time interval is less than the second threshold.

The FSR output may be a voltage outputted by the FSR. In this event, the voltage output at a given time is inversely proportional to the electrical resistance at the given time. The steps of measuring, determining, and detecting may be performed by an analog-to-digital converter (ADC).

The method may further include selecting the biasing force such that the electrical resistance between the traces as a result of the biasing force is on the same order of magnitude as the electrical resistance between the traces as a result of an initial component of an external force applied to one of the substrates in a direction toward the other substrate without the effect of the biasing force on the electrical resistance.

In an embodiment, the electrical resistance between the traces due to the biasing force is $R_{BIAS}$ (where $R_{BIAS}$ is >0 and is constant) and the electrical resistance between the traces due to an external force applied to one of the substrates in a direction toward the other substrate is $R_{FSR}$ (where $R_{FSR} \geq 0$ and varies as a function of the external force). In this event, the method further includes selecting $R_{BIAS}$ such that $R_{BIAS}$ is on the same order of magnitude as $R_{FSR}$ at the time an initial component of an external force is applied to one of the substrates in a direction toward the other substrate.

Further, in carrying out the above objects and other objects, the present invention provides a method for a FSR having first and second substrates in which the first substrate includes electrically conductive and separated traces and the second substrate includes a resistive layer and in which the substrates are continuously subjected to a biasing force such that the substrates contact one another with the resistive layer contacting and electrically connecting the traces together with an electrical resistance that inversely depends on the biasing force. Upon an external force being applied to one of the substrates in a direction toward the other substrate, the substrates contact one another with a total force which is the sum of the biasing force and the external force with the resistive layer contacting and electrically connecting the traces together with an electrical resistance that inversely depends on the total force. The method includes measuring an output of the FSR over a time period in which the FSR output is a function of the electrical resistance. The method further includes determining whether a change in magnitude of the FSR output during a first time interval of the time period is greater than a threshold. The method further includes detecting an external touch applied on the FSR during the first time interval if the change in magnitude of the FSR output during the first time interval is greater than the threshold.

The method may further include determining whether a change in magnitude between the output in a subsequent second time interval of the time period is less than a second threshold. In this event, the method further includes detecting release of the touch from the FSR during the second time interval if the change in magnitude between the FSR output during the second time interval is less than the second threshold. The steps of measuring, determining, and detecting may be performed by an analog circuit.

A pre-loaded FSR represents a new paradigm that reworks the utility of FSRs. For example, in accordance with embodiments of the present invention, measuring a pre-loaded FSR allows exquisitely sensitive detection of finger touch or press through any thick material including metals which are not compatible with capacitive touch sensors. Previously sensing through thick materials was problematic because it required significant deflections. Additionally, in accordance with embodiments of the present invention, changes in a pre-loaded FSR caused by temperature, humidity, and aging are allowed to be completely ignored.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
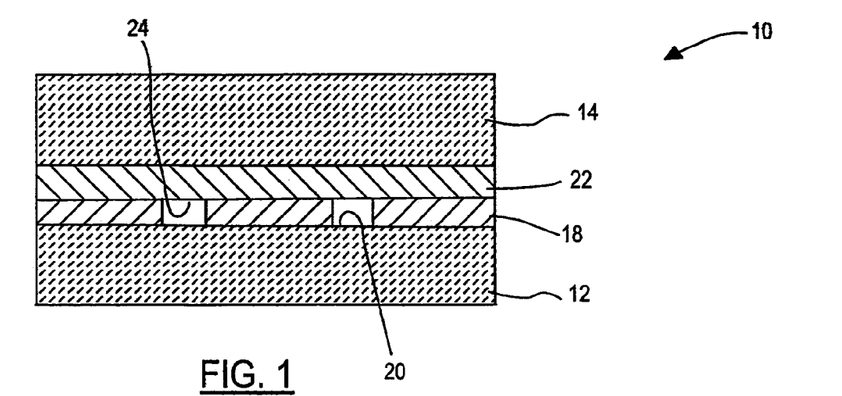
FIG. 1 illustrates a cross-sectional view of a pre-loaded force sensing resistor (FSR) in accordance with an embodiment of the present invention.

Referring now to FIG. 1, a cross-sectional view of a pre-loaded force sensing resistor (FSR) 10 in accordance with an embodiment of the present invention is shown. Pre-loaded FSR 10 produces an electrical signal indicative of applied pressure. Pre-loaded FSR 10 includes first and second substrates (membranes) 12, 14. Substrates 12, 14 may be individual portions obtained from the sheet of material such as, for example, Mylar. First substrate 12 includes electrically conductive traces 18 on an inner surface 20 of the first substrate. Second substrate 14 includes a resistive layer 22 on an inner surface 24 of the second substrate.

Pre-loaded FSR 10 as shown in FIG. 1 has first substrate 12 positioned beneath second substrate 14 such that traces 18 are positioned beneath resistive layer 22. Of course, pre-loaded FSR 10 functions the same if first substrate 12 is positioned above second substrate 14 such that traces 18 are positioned above resistive layer 22. Traces 18 may be formed on first substrate 12 by any suitable means known in the art. For example, traces 18 may be formed by depositing conductive material onto first substrate and then selectively removing portions of the conductive material to define the traces. Traces 18 may also be formed by depositing conductive polymer thick film ink (usually by screen printing) on first substrate 12. Dimensions for traces 18 depend on the dimensions of FSR 10, material and construction for substrates 12, 14, material and construction for resistive layer 22, and the like. Resistive layer 22 may be an FSR ink.

First and second substrates 12, 14 are in contact with one another at all times such that resistive layer 22 of second substrate 14 contacts and electrically connects traces 18 of first substrate 12 together. This biasing force between substrates 12, 14 is present even in the absence of an externally applied force on at least one of the substrates. Resistive layer 22 shorts traces 18 together with an electrical resistance that inversely depends on the amount of the biasing force. As such, the electrical resistance between traces 18 decreases (increases) as the biasing force increases (decreases). In accordance with embodiments of the present invention, the biasing force is constant such that the electrical resistance between traces 18 is constant in the absence of an externally applied force being applied to at least one of substrates 12, 14.

While an external force is applied to one of substrates 12, 14 in a direction toward the other one of the substrates (e.g., a touch press on the substrate), the substrates contact one another with a greater force. That is, the substrates 12, 14 are subjected to the biasing force and the externally applied force which add to form a total force. Resistive layer 22 shorts traces together with an electrical resistance that inversely depends on the amount of the total force. As such, the electrical resistance between traces 18 decreases as the total force increases.

Figure 2:
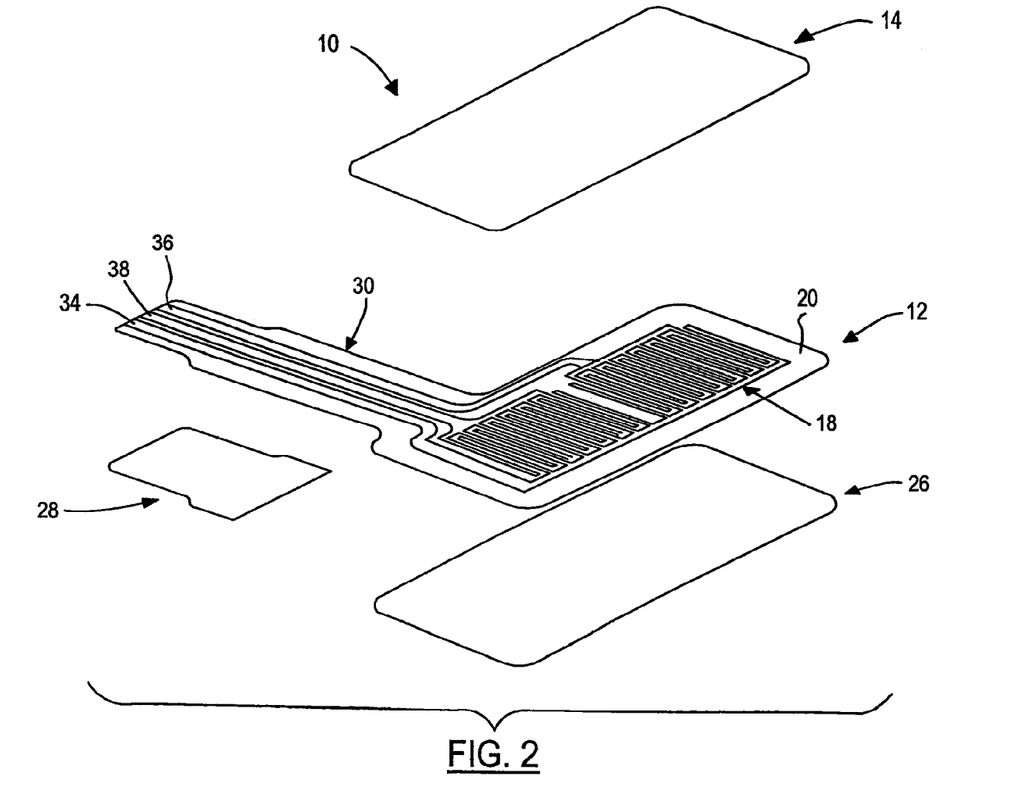
FIG. 2 illustrates an exploded view of the pre-loaded FSR.

Referring now to FIG. 2, with continual reference to FIG. 1, an exploded view of pre-loaded FSR 10 is shown. As shown in FIG. 2, pre-loaded FSR 10 includes second substrate 14 (i.e., top substrate), first substrate 12 (i.e., bottom substrate), and traces 18 on inner surface 20 of the first substrate. Pre-loaded FSR 10 further includes a rear adhesive layer 26 which adheres to the bottom side of bottom substrate 12. Not shown is an optional top environmental protection layer on top of top substrate 14. The top protection layer could be transparent and have printing on its inside surface. Pre-loaded FSR 10 further includes a tail stiffener 28 for providing structural support to a connector portion 30 of bottom substrate 12. Tail stiffener 28 may provide additional thickness for meeting the specifications for insertion into a specific connector.

Figure 3:
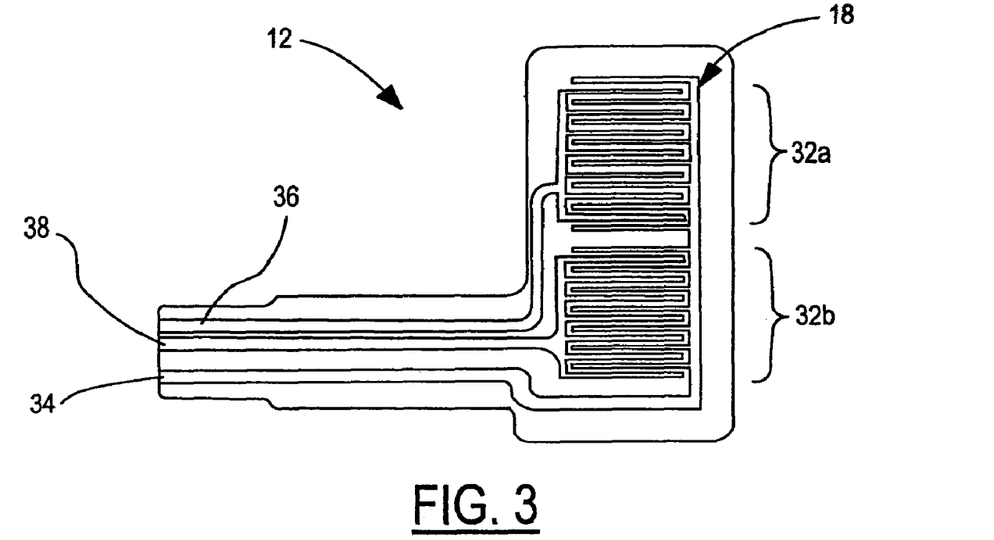
FIG. 3 illustrates a view of the bottom substrate of the pre-loaded FSR.

Referring now to FIG. 3, with continual reference to FIGS. 1 and 2, a view of bottom substrate 12 of pre-loaded FSR 10 is shown. Traces 18 are arranged within two zones. Multiple zones permit different functions such as locating the position of pressure on either substrate 12, 14, allowing independent pressure measurement in two locations, etc.

The first zone is defined by a first set 32*a* of interdigitated trace fingers 18 and the second zone is defined by a second set 32*b* of interdigitated trace fingers 18. Each interdigitated trace finger set 32*a*, 32*b* shares a common trace 34. Interdigitated trace finger sets 32*a*, 32*b* has respective lead traces 36, 38. Common trace 34 and lead traces 36, 38 are electrically separated and extend down connector portion 30 of bottom substrate 12.

Figure 4:
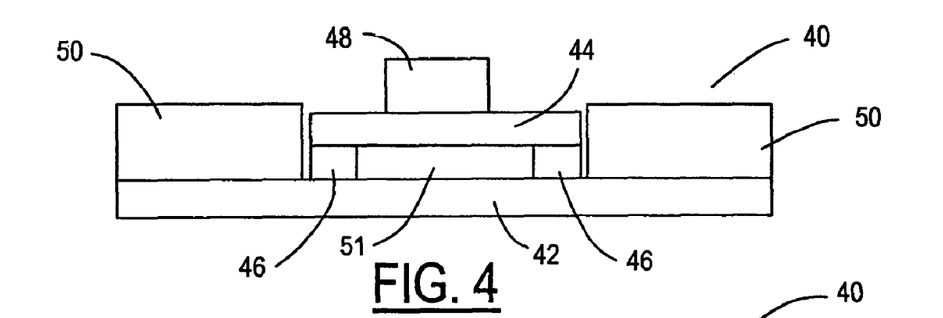
FIG. 4 illustrates a cross-sectional view of a FSR in accordance with another embodiment of the present invention in which the FSR has not yet been pre-loaded.

Referring now to FIG. 4, a cross-sectional view of an FSR 40 in accordance with another embodiment of the present invention in which the FSR has not yet been pre-loaded is shown. FSR 40 is constructed in a usual fashion with bottom and top substrates 42, 44 separated by a spacer 46 at the outer perimeter. Bottom substrate 42 includes a set of interdigitated traces (not shown) on its inner surface and top substrate 44 includes a resistive layer (not shown) on its inner surface. Spacer 46 serves to space apart substrates 42, 44 and to adhere the structure together.

Figure 5:
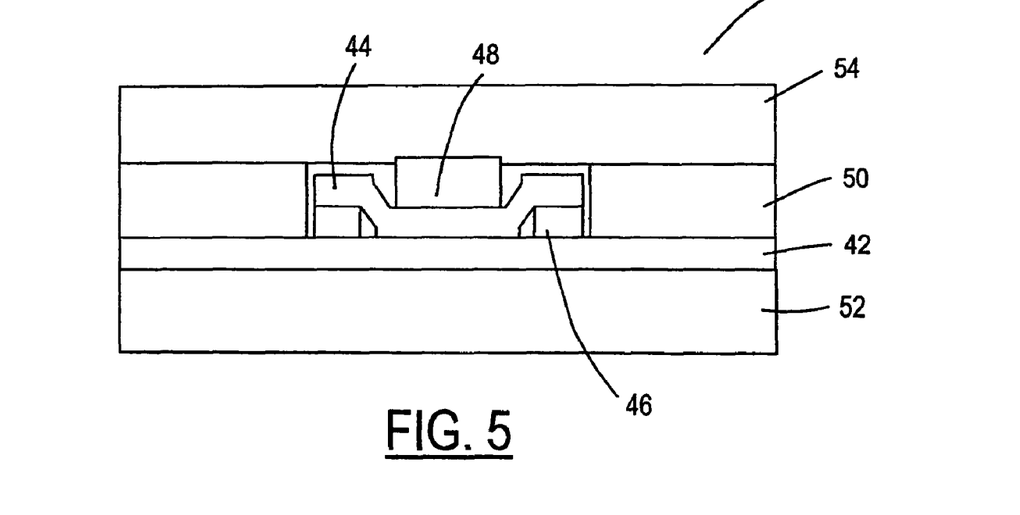
FIG. 5 illustrates a cross-sectional view of the FSR shown in FIG. 4 in which the FSR is mounted in a perpetually pre-loaded state.

An actuator puck 48 and a surrounding adhesive shroud 50 are added in order to permanently pre-load FSR 40. The purpose of actuator puck 48 is to compress downward and close internal air gap 51 between substrates 42, 44. This happens when the FSR assembly and surrounding shroud are together laminated between two outer layers 52, 54 (see FIG. 5). Outer layers 52, 54 are components of a host device. For example, one of outer layers 52 may be the front glass face of a cell phone and the second one of outer layers 54 may be an internal rigid frame such as around an LCD display. Shroud 50 supplies sufficient adhesive tension force to hold outer layers 52, 54 together and clamp FSR 40 closed (i.e., compress top substrate 44 towards bottom substrate 42 such that substrates 42, 44 contact and meet one another with a biasing force thereby resulting in FSR 40 being pre-loaded).

Actuator puck 48 is a piece of material that may be screen printed onto the external surface of top substrate 48. For example, actuator puck 48 may be screen printed using a dielectric spacer material such as Dupont 5018 UV cured screen-printable dielectric paste. Alternately, actuator puck 48 may be die cut from an adhesive film such as 3M 7962. Actuator puck 48 may be die cut from a composite film such as 3M 7962 laminated to a polyester film. Any technique to form actuator puck 48 of sufficient thickness is acceptable. Shroud 50 may be formed and fabricated together with FSR 40 and supplied with the FSR as a single piece, or may be formed and assembled into the host device in separate steps from FSR 40.

To guarantee closure of air gap 51, actuator puck 48 has to protrude above shroud 50 by a height greater than that of the air gap. When laminated between layers 52, 54, there will then be a slight mechanical interference between actuator puck 48 and one of those layers 52, 54. Ideally, this interference is large enough to guarantee loading of FSR 40 under all thickness tolerance scenarios but not thick enough to cause bowing of layer 54 or other problems of fit. This mechanical interference can be seen in FIG. 5.

In accordance with embodiments of the present invention, the basis for detecting presses and releases (i.e., finger touches and releases) on a pre-loaded FSR (such as pre-loaded FSRs 10 and 40) includes measuring the time derivative of the electrical resistance of the pre-loaded FSR. That is, the basis for the measurement method is to measure the time derivative of the pre-loaded FSR output instead of the output itself. This works well because slow changes can be ignored while relatively fast changes caused by finger touches and releases are easily detected. It is noted that the biasing force will drift with temperature and/or aging of the mechanical FSR assembly over relatively long periods of time. These drifts are all on a much longer time scale than a finger contact press and release and can be ignored by the measurement method.

Circuit and Firmware for Using an ADC to Determine Touch

Figure 6:
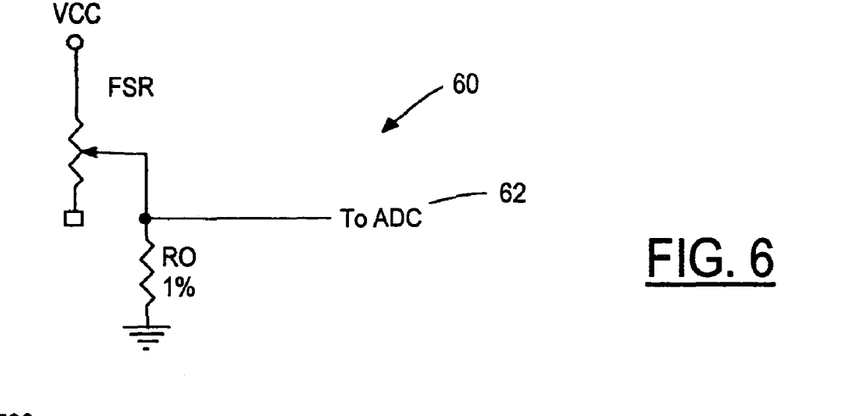
FIG. 6 illustrates a circuit that places a pre-loaded FSR into a voltage divider for measuring the time derivative of the electrical resistance of the pre-loaded FSR in order to detect presses and releases in accordance with an embodiment of the present invention.

Portable electronic devices such as cell phones often contain a microprocessor, microcontroller, or other integrated circuit having an analog-to-digital converter (ADC). In accordance with embodiments of the present invention, such a system may be used to simply and easily measure the time derivative of the electrical resistance of a pre-loaded FSR and to detect presses and releases. A circuit 60 and algorithm which use the ADC (or an external ADC) for accomplishing this are described below.

Referring now to FIG. 6, a circuit 60 that places a pre-loaded FSR into a voltage divider for measuring the time derivative of the electrical resistance of the pre-loaded FSR in order to detect presses and releases in accordance with an embodiment of the present invention is shown. For a given change in the resistance of the pre-loaded FSR ($R_{FSR}$), the voltage to ADC 62 can be shown to have the largest change when $R_{FSR}$ and $R_0$ are equal, where $R_{FSR}$ is the resistance caused by an external force (i.e., finger touch or release) applied onto at least one of the substrates of the pre-loaded FSR and $R_0$ is the resistance caused by the pre-loaded biasing force. From a practical standpoint, it is only necessary that $R_{FSR}$ and $R_0$ have the same order of magnitude.

Voltage at ADC 62 is measured on a regular schedule such as every 20 ms (50 times per second). The regularity of this interval is important because changes in the time base could incorrectly appear as variations in dR/dt. Also, if dt is a constant then it can be ignored in further calculations.

The voltage on ADC 62 is given by the following equation:

$$V_{ADC} = Vcc * [R_0/(R_0 + R_{FSR})]$$

Because force and resistance are inversely proportional and because $R_{FSR}$ appears in the denominator of the above equation, $V_{ADC}$ is proportional to applied force. It is sufficient and useful to ignore any calibration or proportionality constants and simply equate the force at each time interval to $V_{ADC}$.

The force F is acquired in the above manner after every measurement. A simple calculation of dF is then: $dF_i = F_i - F_{i-1}$, where i represents the ith sample and i−1 refers to the previous sample.

A further step in the algorithm is to accumulate the dFi continuously into a sum. This amounts to a simple version of integrating over the derivative, which has the net effect of returning the force minus the force of the pre-load.

The approximate nature of these mathematical operations, coupled with the discrete 8 or 16-bit integer math roundoff errors that typically accumulate in such ADC operations, necessitate a final operation. This is to add a decay term to the summed dFi. This has the effect of causing the result to remain near zero during slow changes and to return the result to zero shortly after quick changes. One way to do this is to subtract, at each time interval, some fraction of the sum. The final output is this algorithm is then:

$$F' = \Sigma dFi - (1/16)\Sigma dFi$$

where a 16th of the sum is removed after each measurement. Other fractions may be chosen depending on the measurement period and preferred response characteristics.

Figure 7:
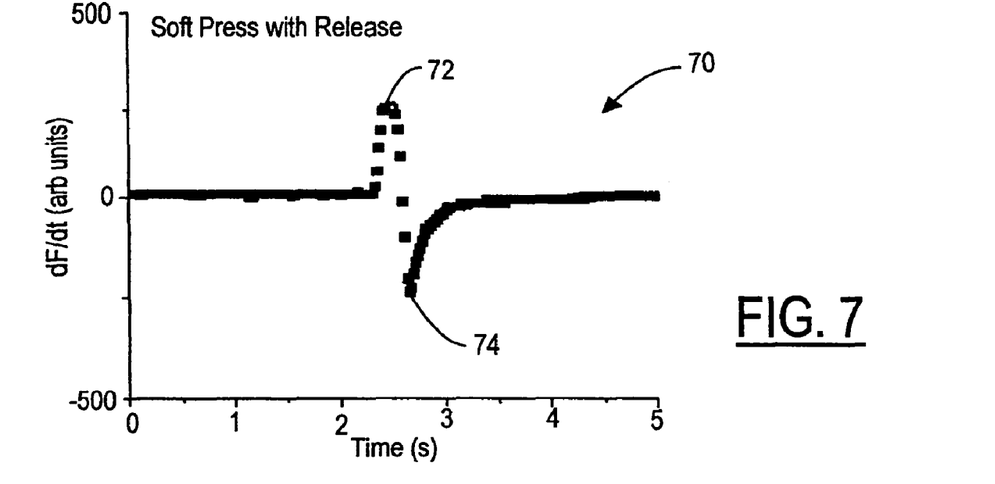
FIG. 7 illustrates a first example output produced by a method of measuring a pre-loaded FSR in accordance with an embodiment of the present invention.
Figure 8:
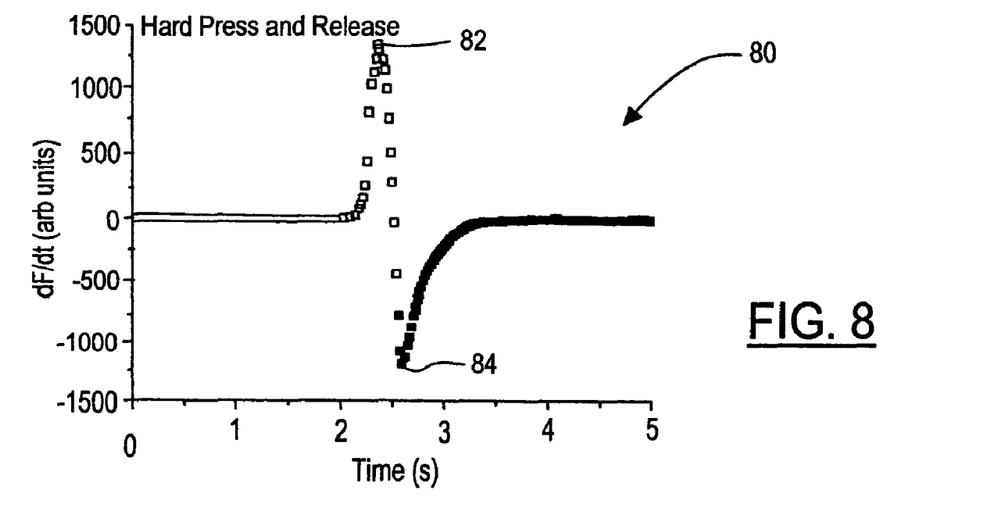
FIG. 8 illustrates a second example output produced by the method of measuring a pre-loaded FSR.
Figure 9:
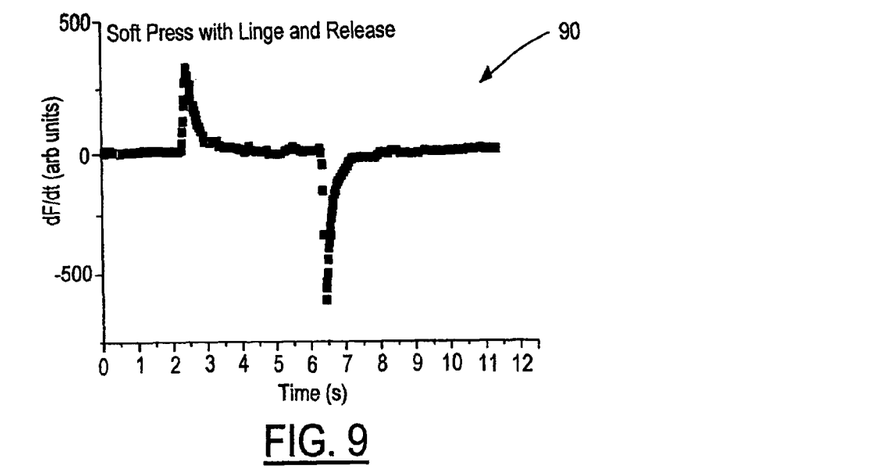
FIG. 9 illustrates a third example output produced by the method of measuring a pre-loaded FSR.

Referring now to FIGS. 7, 8, and 9, respective example outputs 70, 80, and 90 produced by the measuring algorithm are shown. In this example, with reference to FIGS. 4 and 5, pre-loaded sensor 40 and shroud 50 are sandwiched between an aluminum plate 52 on the bottom and a 1 mm thick plate of glass 54 on the top. FSR 40 is pre-loaded to a level around 20 kOhms so R0 is chosen to be 20 kOhms. Here the measurement period is 20 ms (fifty samples per second). Each measurement is the sum of eight measurements taken in rapid succession with a 10-bit ADC. Outputs 70, 80, and 90 are shown in arbitrary units versus time.

Output 70 shown in FIG. 7 is during a very light touch at about t=2.25 seconds immediately followed by release of the touch. There is a strong and easily detected positive peak 72 during the touch and then a similar negative peak 74 during the immediately subsequent release.

Output 80 shown in FIG. 8 is during a strong touch immediately followed by release of the touch. Again a positive peak 82 appears during press and a negative peak 84 during release. Peaks 82, 84 are roughly five times higher than peaks 72, 74 during a soft touch.

Output 90 shown in FIG. 9 is during a light touch and a release where the touch and release are separated in time. The lingering between touch and release does not decrease the detectability of the release.

With these clear peaks, touch detection can be accomplished with a simple thresholding scheme. For example, if dF/dt exceeds 200 units a touch is detected and the touch remains until dF/dt falls below −200 units. Here 200 units is only an example and depends on the specific mounting and measuring details of a given system.

Analog Circuits for Measuring Pre-Loaded FSRs

Figure 10:
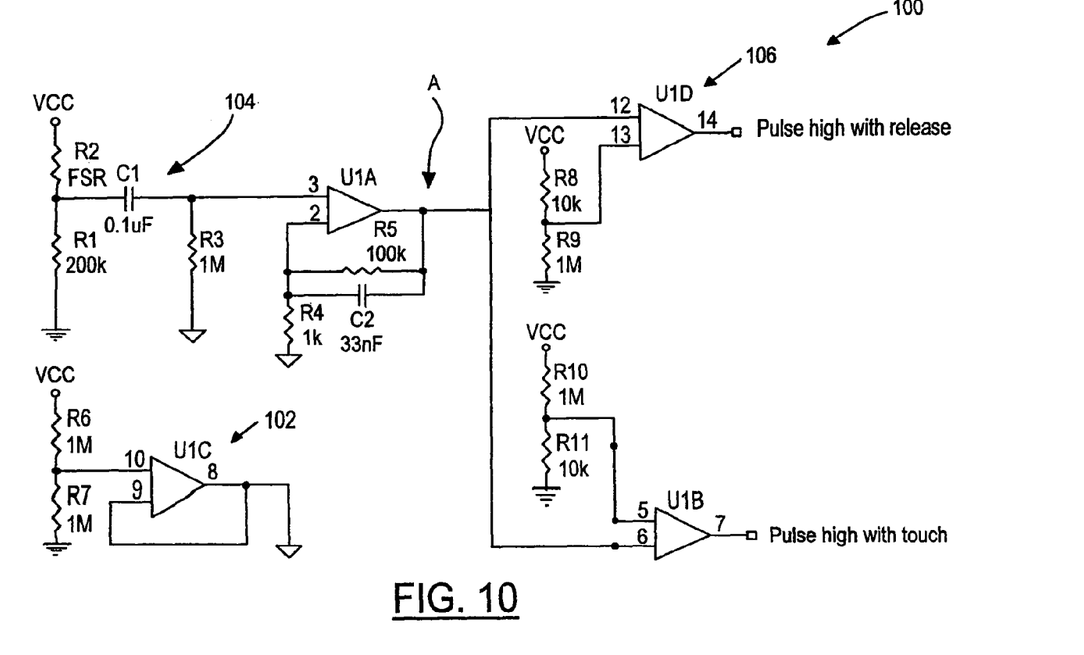
FIG. 10 illustrates an analog circuit for use with the method of measuring a pre-loaded FSR.

Referring now to FIG. 10, an analog circuit 100 for use with the method of measuring a pre-loaded FSR in accordance with an embodiment of the present invention is shown. The use of analog circuit 100 is preferred, for example, when no ADC is present or when an ADC may not have the resources to measure the pre-loaded FSR on a regular schedule.

Analog circuit 100 includes an analog op-amp circuit which is one approach to measuring a pre-loaded FSR. Analog circuit 100 shown in FIG. 10 is an example of such an analog op-amp circuit. Analog circuit 100 uses a single quad op-amp IC such as an MCP6144. One of the stages 102 provides a Vcc/2 reference, one of the other stages 104 provides gain and smoothing, and two of the other stages 106, 108 are configured as comparators.

R2 (resistance of the FSR caused by an external applied force) is placed in a voltage divider with R1 (resistance of the FSR caused by the constant biasing force) so that changes in the FSR resistance caused by varying force causes the voltage between R2 and R1 to vary. An increasing force causes R2 to decrease and the voltage to increase. Likewise, a decreasing force causes R2 to increase and the voltage to decrease. This varying voltage is coupled into C1 which is referenced to Vcc/2. This simple circuit effectively takes the time derivative of the FSR resistance.

The Vcc/2 reference voltage is created in stage 102 by a voltage divider and op amp U1C configured as a voltage follower.

The AC component of the voltage changes is thereby coupled into U1A of stage 104, which provides a gain of 100 and some low-pass smoothing. The inverting input of U1A is referenced to Vcc/2 so that its output while the FSR resistance is constant remains at Vcc/2 but its output while the FSR resistance is changing will swing all the way to either rail. In this way, the output of U1A is essentially the amplified derivative of the resistance signal. It swings high when R is dropping during a press and low when R2 is rising during a release.

The output of op-amp stage U1A is then fed into two comparators made from op amps (U1D and U1B) of stages 106, 108. Comparator U1D is configured to go high when its input signal is near ground. The other comparator U1B goes high when its input signal is near Vcc. These two comparators square up the amplified derivative signal to give the output signals.

The comparator outputs are two lines: "touch detected" and "release detected." These could both be interfaced to a host CPU or combined using a latch to provide a single "currently touched" line.

Figure 11:
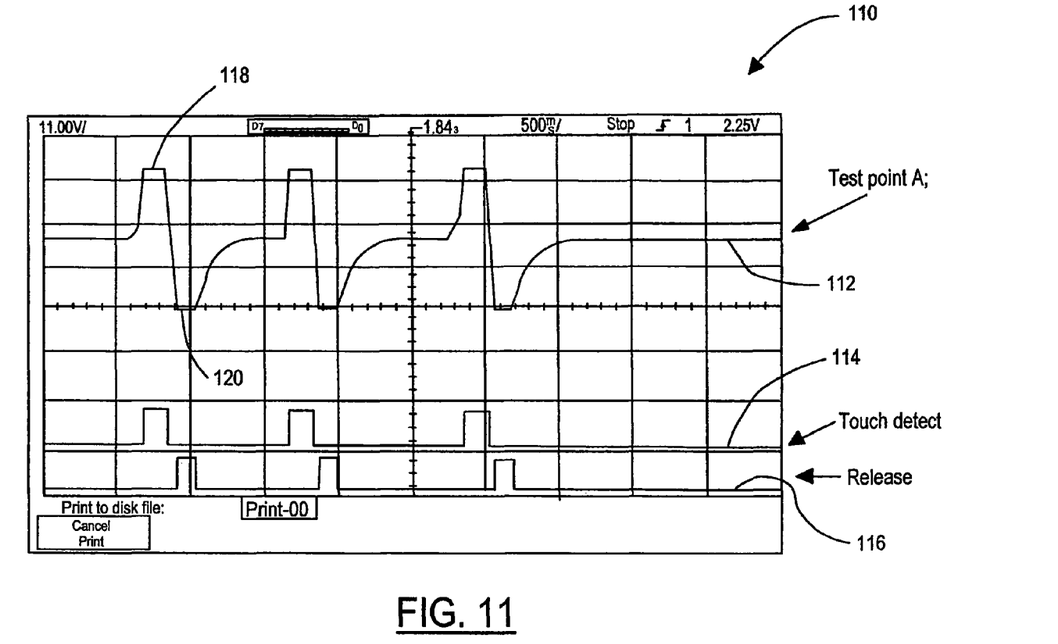
FIG. 11 illustrates an example output produced by the analog circuit.

Referring now to FIG. 11, an example output 110 produced by analog circuit 100 is shown. Example output 110 includes three oscilloscope trace outputs 112, 114, and 116 from analog circuit 100. Trace 112 is the output of U1A (point A in FIG. 10) during three touch and release events. Each touch has a positive peak 118 that clips at the positive power supply rail followed by a release event that creates a negative peak 120 that clips at the negative power supply rail. Traces 114, 116 are the respective outputs from the two comparators of stages 108, 106. While the derivative signal is near the positive rail, the "touch" comparator output 114 is high. While the derivative signal is near the negative rail the "release" signal 116 is high. A host device could detect these two lines and synthesize a "currently touched" signal using firmware.

If the quad op amp is "micropower" then the whole circuit can be low power. With an MCP6144 op amp and Vcc=3.3V, a prototype circuit draws around ten microamps.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A force sensing resistor (FSR) comprising:
   a first substrate having first and second electrically conductive traces on an inner surface, wherein the traces are electrically separated from one another; and
   a second substrate having a resistive layer on an inner surface;
   wherein the substrates are subjected to a biasing force such that during the biasing force the substrates are in contact with one another with the resistive layer contacting and electrically connecting the traces together with an electrical resistance that inversely depends on the biasing force;
   wherein while an external force is applied to one of the substrates in a direction toward the other substrate, the substrates contact one another with a total force which is the sum of the biasing force and the external force with the resistive layer contacting and electrically connecting the traces together with an electrical resistance that inversely depends on the total force;
   wherein the biasing force is present regardless of either the presence or absence of the external force.

2. The FSR of claim 1 wherein:
the resistive layer includes a force sensing resistor ink.

3. The FSR of claim 1 wherein:
the first substrate includes a third electrically conductive trace on the inner surface, wherein the traces are electrically separated from one another, wherein the first and second traces are interdigitated with one another in a first area of the inner surface of the first substrate and the second and third traces are interdigitated with one another in a different second area of the inner surface of the first substrate;
wherein during the biasing force the resistive layer contacts and electrically connects the first and second traces together and the second and third traces together with an electrical resistance that inversely depends on the biasing force.

4. The FSR of claim 3 wherein:
while a first external force is applied adjacent to the first area to one of the substrates in a direction toward the other substrate, the substrates contact one another at the first area with a first total force which is the sum of the biasing force and the first external force with the resistive layer contacting and electrically connecting the first and second traces together with an electrical resistance that inversely depends on the first total force.

5. The FSR of claim 4 wherein:
while a second external force is applied adjacent to the second area to one of the substrates in a direction toward the other substrate, the substrates contact one another at the second area with a second total force which is the sum of the biasing force and the second external force with the resistive layer contacting and electrically connecting the second and third traces together with an electrical resistance that inversely depends on the second total force.

6. The FSR of claim 1 further comprising:
an actuator puck, wherein the actuator puck is attached to an outer surface of one of the substrates and subjects the biasing force onto the substrates.

7. The FSR of claim 6 further comprising:
a spacer, wherein the spacer attaches the substrates together such that an air gap separates the inner surfaces of the substrates;
wherein the actuator puck compresses the substrates together with the biasing force such that the inner surfaces of the substrates are in contact with one another with the air gap being eliminated.

8. A method for a force sensing resistor (FSR) having first and second substrates with the first substrate including electrically conductive and separated traces and the second substrate including a resistive layer in which the substrates are continuously subjected to a biasing force such that the substrates contact one another with the resistive layer contacting and electrically connecting the traces together with an electrical resistance that inversely depends on the biasing force, wherein, upon an external force being applied to one of the substrates in a direction toward the other substrate, the substrates contact one another with a total force which is the sum of the biasing force and the external force with the resistive layer contacting and electrically connecting the traces together with an electrical resistance that inversely depends on the total force, the method comprising:
   measuring samples of an output of the FSR periodically over a time period in which the FSR output is a function of the electrical resistance;
   determining whether a change in magnitude between at least two consecutive FSR output samples during a first time interval of the time period is greater than a threshold; and
   detecting an external touch applied on the FSR during the first time interval if the change in magnitude between the at least two consecutive FSR output samples during the first time interval is greater than the threshold.

9. The method of claim 8 further comprising:
determining whether a change in magnitude between at least two consecutive FSR output samples in a subsequent second time interval of the time period is less than a second threshold; and
detecting release of the touch from the FSR during the second time interval if the change in magnitude between the at least two consecutive FSR output samples during the second time interval is less than the second threshold.

10. The method of claim 8 wherein:
the FSR output is a voltage outputted by the FSR, wherein the voltage output at a given time is inversely proportional to the electrical resistance at the given time.

11. The method of claim 10 wherein:
the steps of measuring, determining, and detecting are performed by an analog-to-digital converter (ADC).

12. The method of claim 8 further comprising:
selecting the biasing force such that the electrical resistance between the traces as a result of the biasing force is on the same order of magnitude as the electrical resistance between the traces as a result of an initial component of an external force applied to one of the substrates in a direction toward the other substrate without the effect of the biasing force on the electrical resistance.

13. The method of claim 8 wherein the electrical resistance between the traces due to the biasing force is $R_{BIAS}$ (where $R_{BIAS}$ is >0 and is constant), wherein the electrical resistance between the traces due to an external force applied to one of the substrates in a direction toward the other substrate is $R_{FSR}$ (where $R_{FSR} \geq 0$ and varies as a function of the external force), the method further comprising:
selecting $R_{BIAS}$ such that $R_{BIAS}$ is on the same order of magnitude as $R_{FSR}$ at the time an initial component of an external force is applied to one of the substrates in a direction toward the other substrate.

14. The method of claim 8 wherein:
the biasing force is present regardless of either the presence or absence of the external force.

15. A method for a force sensing resistor (FSR) having first and second substrates in which the first substrate includes electrically conductive and separated traces and the second substrate includes a resistive layer and in which the substrates are continuously subjected to a biasing force such that the substrates contact one another with the resistive layer contacting and electrically connecting the traces together with an electrical resistance that inversely depends on the biasing force, wherein, upon an external force being applied to one of the substrates in a direction toward the other substrate, the substrates contact one another with a total force which is the sum of the biasing force and the external force with the resistive layer contacting and electrically connecting the traces together with an electrical resistance that inversely depends on the total force, the method comprising:
measuring an output of the FSR over a time period in which the FSR output is a function of the electrical resistance;
determining whether a change in magnitude of the FSR output during a first time interval of the time period is greater than a threshold; and
detecting an external touch applied on the FSR during the first time interval if the change in magnitude of the FSR output during the first time interval is greater than the threshold.

16. The method of claim 15 further comprising:
determining whether a change in magnitude between the output in a subsequent second time interval of the time period is less than a second threshold; and
detecting release of the touch from the FSR during the second time interval if the change in magnitude between the FSR output during the second time interval is less than the second threshold.

17. The method of claim 15 wherein:
the FSR output is a voltage outputted by the FSR, wherein the voltage output at a given time is inversely proportional to the electrical resistance at the given time.

18. The method of claim 15 wherein:
the steps of measuring, determining, and detecting are performed by an analog circuit.

19. The method of claim 15 further comprising:
selecting the biasing force such that the electrical resistance between the traces as a result of the biasing force is on the same order of magnitude as the electrical resistance between the traces as a result of an initial component of an external force applied to one of the substrates in a direction toward the other substrate without the effect of the biasing force on the electrical resistance.

20. The method of claim 15 wherein the electrical resistance between the traces due to the biasing force is $R_{BIAS}$ (where $R_{BIAS}$ is >0 and is constant), wherein the electrical resistance between the traces due to an external force applied to one of the substrates in a direction toward the other substrate is $R_{FSR}$ (where $R_{FSR} \geq 0$ and varies as a function of the external force), the method further comprising:
selecting $R_{BIAS}$ such that $R_{BIAS}$ is on the same order of magnitude as $R_{FSR}$ at the time an initial component of an external force is applied to one of the substrates in a direction toward the other substrate.

* * * * *